(12) United States Patent
Yeh et al.

(10) Patent No.: US 11,630,020 B2
(45) Date of Patent: Apr. 18, 2023

(54) PRESSURE SENSOR WITH CALIBRATION DEVICE AND CALIBRATION METHOD THEREOF

(71) Applicant: Industrial Technology Research Institute, Hsinchu (TW)

(72) Inventors: Che-Kai Yeh, Tainan (TW); Tzung-Ching Lee, Hsinchu County (TW); Yu-Wen Hsu, Tainan (TW); Chao-Ta Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 60 days.

(21) Appl. No.: 17/371,102

(22) Filed: Jul. 9, 2021

(65) Prior Publication Data

US 2022/0196505 A1   Jun. 23, 2022

(30) Foreign Application Priority Data

Dec. 21, 2020 (TW) .................................. 109145312

(51) Int. Cl.
*G01L 27/00* (2006.01)
*G01L 19/14* (2006.01)
*G01L 19/00* (2006.01)

(52) U.S. Cl.
CPC ........ *G01L 27/005* (2013.01); *G01L 19/0092* (2013.01); *G01L 19/14* (2013.01)

(58) Field of Classification Search
None
See application file for complete search history.

(56) References Cited

U.S. PATENT DOCUMENTS

| 4,886,070 A | 12/1989 | Demarest |
| 6,076,409 A | 6/2000 | Bang |

(Continued)

FOREIGN PATENT DOCUMENTS

| CN | 103481478 | 1/2014 |
| CN | 102257372 | 7/2014 |

(Continued)

OTHER PUBLICATIONS

"Notice of Allowance of Taiwan Counterpart Application," dated Nov. 29, 2021, p. 1-p. 4.

(Continued)

*Primary Examiner* — Brandi N Hopkins
*Assistant Examiner* — Nigel H Plumb
(74) *Attorney, Agent, or Firm* — JCIPRNET (57) ABSTRACT

A pressure sensor with calibration device includes a casing, a diaphragm, a sensing element, a medium, and at least one calibration element. The diaphragm is disposed on the casing, wherein the casing and the diaphragm define an accommodating space. The sensing element is disposed in the casing. The medium is filled in the accommodating space and in contact with the sensing element. The at least one calibration element is adjustably disposed at the casing and extended into the accommodating space to be in contact with the medium, wherein when the at least one calibration element is moved relative to the casing in a direction toward the accommodating space or in a direction away from the accommodating space, the at least one calibration element changes the pressure applied to the medium. The pressure sensor with calibration device adjusts the pressure value sensed by the sensing element via the calibration element.

26 Claims, 9 Drawing Sheets

(56) References Cited

U.S. PATENT DOCUMENTS

| | | |
|---|---|---|
| 6,311,561 B1 | 11/2001 | Bang et al. |
| 6,581,436 B2 | 6/2003 | Mannhart |
| 6,684,709 B2 | 2/2004 | Johnson |
| 7,213,463 B2 | 5/2007 | Otsuka |
| 7,392,687 B2 | 7/2008 | Huang et al. |
| 7,421,903 B2 | 9/2008 | Brosh |
| 7,476,095 B2 | 1/2009 | Bader et al. |
| 7,543,501 B2 * | 6/2009 | Cottles ................. G01L 27/007 73/715 |
| 7,918,138 B2 * | 4/2011 | Jiang .................... G01L 27/005 73/754 |
| 8,082,796 B1 | 12/2011 | Doelle |
| 8,117,920 B2 * | 2/2012 | Vogler ............... G01L 19/0645 73/706 |
| 8,425,217 B2 * | 4/2013 | Groleau ................. B29C 45/77 425/149 |
| 8,602,053 B2 | 12/2013 | Jjilderos |
| 8,920,150 B2 * | 12/2014 | Tanaka ................. B29C 45/401 425/170 |
| 9,003,897 B2 * | 4/2015 | Wade ....................... G01L 1/18 73/862.623 |
| 9,046,428 B2 * | 6/2015 | Habibi .................. G01L 9/0073 |
| 9,285,289 B2 * | 3/2016 | Dawson ............... G01L 9/0073 |
| 9,476,777 B2 * | 10/2016 | Yonekura ................. G01K 1/14 |
| 10,481,026 B2 * | 11/2019 | May ..................... G01L 9/0055 |
| 2006/0161364 A1 | 7/2006 | Wang et al. |
| 2007/0258506 A1 | 11/2007 | Schwagerman et al. |
| 2008/0066550 A1 | 3/2008 | Kaplan |
| 2013/0182745 A1 | 7/2013 | Hertel et al. |
| 2015/0192478 A1 | 7/2015 | Rueth et al. |
| 2015/0247774 A1 | 9/2015 | Wagner et al. |
| 2017/0199064 A1 | 7/2017 | Lozano |
| 2018/0003580 A1 | 1/2018 | Hansen et al. |

FOREIGN PATENT DOCUMENTS

| | | |
|---|---|---|
| CN | 104626469 | 5/2015 |
| CN | 106584800 | 4/2017 |
| CN | 108072487 | 5/2018 |
| EP | 1967833 | 9/2008 |
| EP | 1873506 | 4/2010 |
| EP | 2450682 | 5/2012 |
| EP | 2002254 | 5/2014 |
| TW | I633289 | 8/2018 |

OTHER PUBLICATIONS

Bo-Na Lee et al., "Calibration and temperature compensation of silicon pressure sensors using ion-implanted trimming resistors", Sensorsand Actuators A: Physical, Jan. 19, 1999, pp. 148-152.

Patrik Melvås et al., "A temperature compensated dual beam pressure sensor", Sensors and Actuators A: Physical, Aug. 15, 2002, pp. 46-53.

Jagdish Chandra Patra et al., "Auto-calibration and -compensation of a capacitive pressure sensor using multilayer perceptrons", ISA Transactions, Apr. 2000, pp. 1-37.

* cited by examiner

PRESSURE SENSOR WITH CALIBRATION DEVICE AND CALIBRATION METHOD THEREOF

CROSS-REFERENCE TO RELATED APPLICATION

This application claims the priority benefit of Taiwan application serial no. 109145312, filed on Dec. 21, 2020. The entirety of the above-mentioned patent application is hereby incorporated by reference herein and made a part of this specification.

TECHNICAL FIELD

The disclosure relates to a pressure sensor with calibration function and a calibration method thereof, and particularly to a pressure sensor that may calibrate a pressure value via a physical method and a calibration method thereof.

BACKGROUND

Currently, the pressure sensed by a pressure sensor in a PCB wet processing equipment may have an error when temperature is changed or the filling state of a medium (such as silicone oil, glycerin) is different. However, since the volume of the cavity of the current pressure sensor is fixed, the volume of the cavity may not be changed according to the filling state of the medium (silicone oil, glycerin), so the pressure sensor needs to be calibrated. At present, the pressure sensor performs initial value calibration via an electronic circuit method. However, the current electronic circuit method for calibration has the disadvantages that the pressure adjustment range of the pressure sensor is limited and the electronic circuit cost is higher.

SUMMARY

The disclosure provides a pressure sensor with calibration function that may adjust the pressure value sensed by a sensing element via a physical method.

A pressure sensor with calibration function of the disclosure includes a casing, a diaphragm, a sensing element, a medium, and at least one calibration element. The diaphragm is disposed on the casing, wherein the casing and the diaphragm define an accommodating space. The sensing element is disposed in the casing. The medium is filled in the accommodating space and in contact with the sensing element. The at least one calibration element is adjustably disposed at the casing and extended into the accommodating space to be in contact with the medium, wherein when the at least one calibration element is moved relative to the casing, the at least one calibration element changes a pressure applied to the medium.

A pressure sensor with calibration function of the disclosure includes a casing, a diaphragm, a sensing element, a medium, and at least one calibration element. The casing has a first rigidity. The diaphragm is disposed on the casing and has a second rigidity, wherein the casing and the diaphragm define an accommodating space. The sensing element is disposed in the casing and includes a sensing film, wherein the sensing film has a third rigidity. The medium is filled in the accommodating space and in contact with the sensing element. The at least one calibration element is adjustably disposed at the casing and extended into the accommodating space to be in contact with the medium, wherein each of the at least one calibration element has a fourth rigidity, and when the at least one calibration element is moved relative to the casing, the at least one calibration element changes a pressure applied to the medium so that a pressure value sensed by the sensing element is changed. The first rigidity and the fourth rigidity are greater than the second rigidity, and the second rigidity is greater than the third rigidity.

A calibration method of a pressure sensor with calibration function of the disclosure includes the following steps. A pressure sensor is provided, wherein the pressure sensor includes a casing, a diaphragm, a sensing element, a medium, and at least one calibration element, the diaphragm is disposed on the casing, the casing and the diaphragm define the accommodating space, the sensing element is disposed in the casing, the medium is filled in the accommodating space and in contact with the sensing element, the at least one calibration element is adjustably disposed at the casing and extended into the accommodating space to be in contact with the medium, and when the at least one calibration element is moved relative to the casing, and the at least one calibration element changes a pressure applied to the medium so that a pressure value sensed by the sensing element is changed. The pressure value sensed by the sensing element is measured. When the pressure value is less than a specific value, at least one calibration element is moved in a direction toward the casing to increase a volume of a portion of the at least one calibration element in the accommodating space, wherein the volume is extended into the accommodating space to increase the pressure applied to the medium until the pressure value sensed by the sensing element is equal to the specific value. When the pressure value is greater than the specific value, the at least one calibration element is moved in a direction away from the casing to decrease the volume of the portion of the at least one calibration element in the accommodating space. The volume is extended into the accommodating space to decrease the pressure applied to the medium until the pressure value sensed by the sensing element is equal to the specific value.

Based on the above, the pressure sensor with calibration function of the disclosure is adjustably disposed at the casing by the calibration element and extended into the accommodating space to be in contact with the medium.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
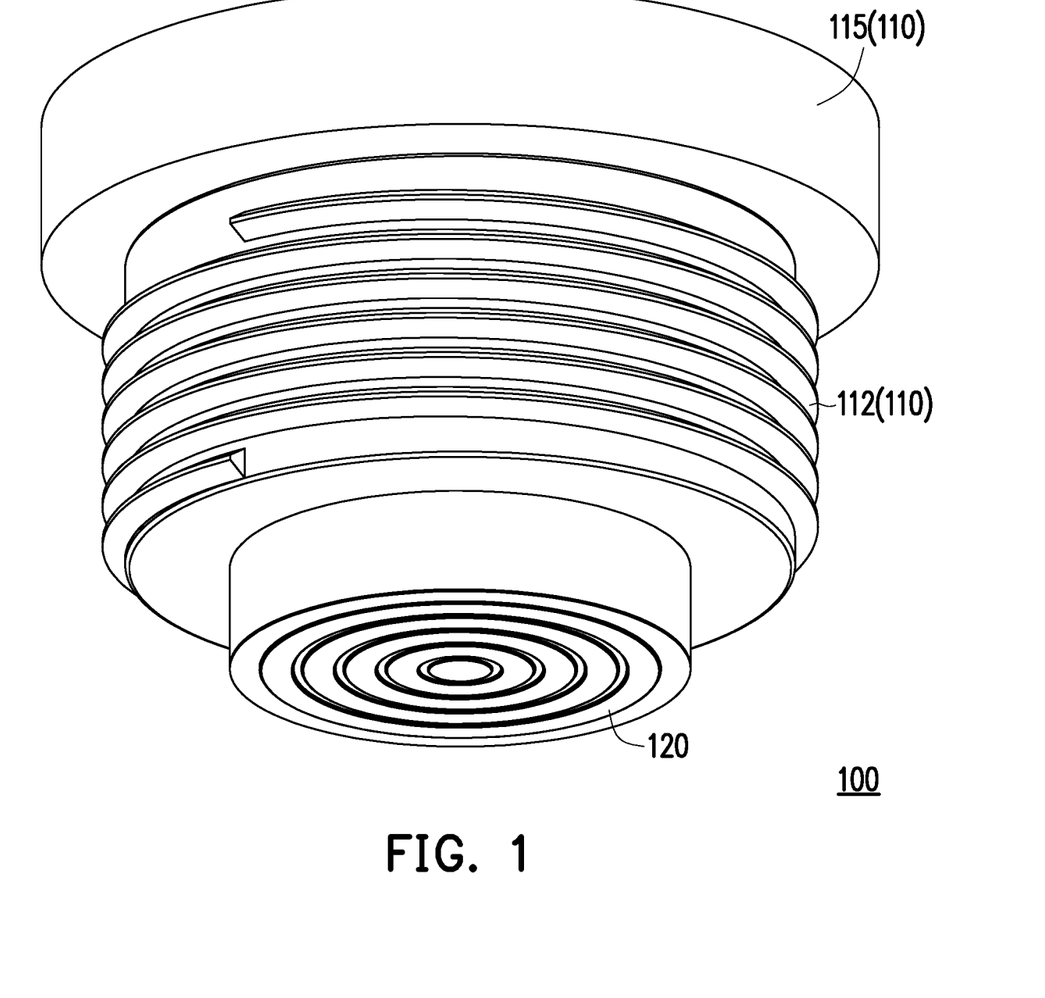
FIG. 1 is a diagram of a pressure sensor with calibration function according to an embodiment of the disclosure.
Figure 2:
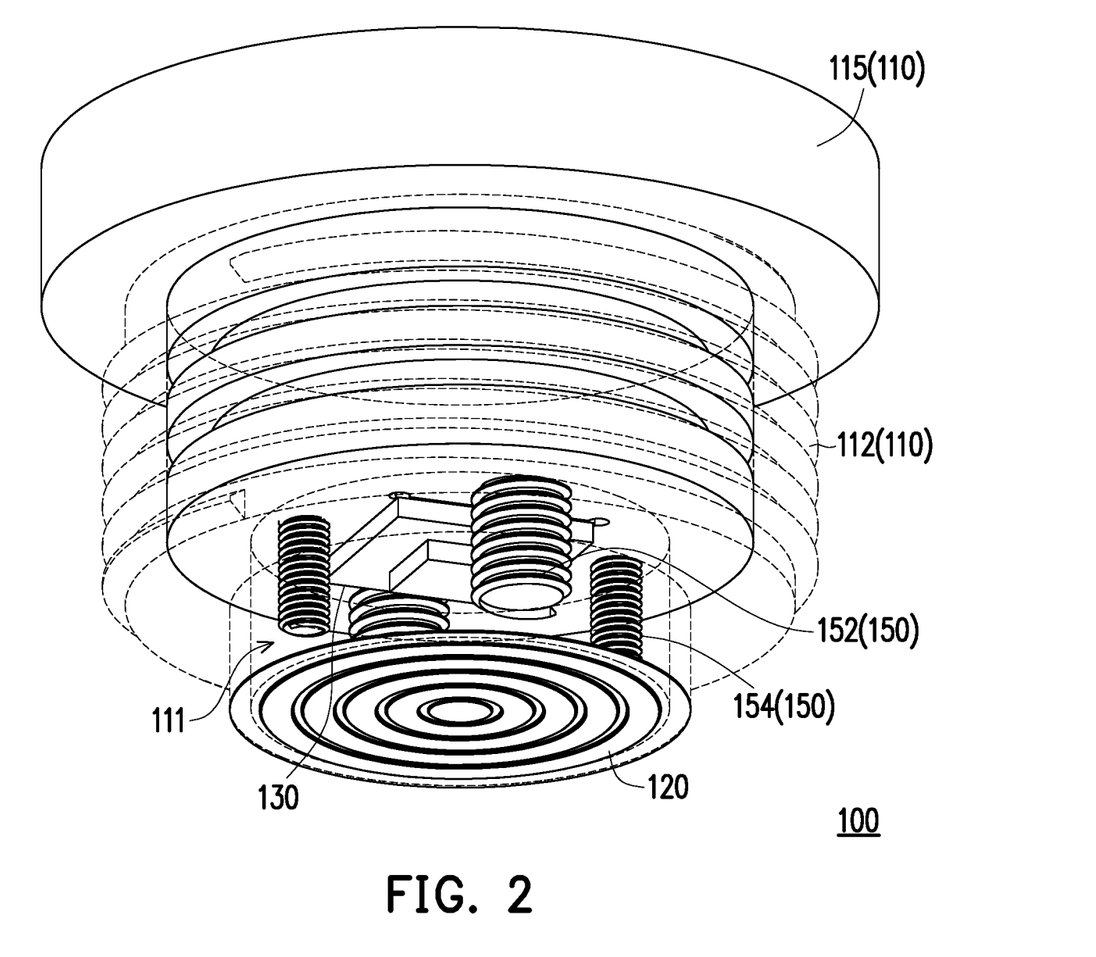
FIG. 2 is a perspective view of the pressure sensor of FIG. 1.
Figure 3:
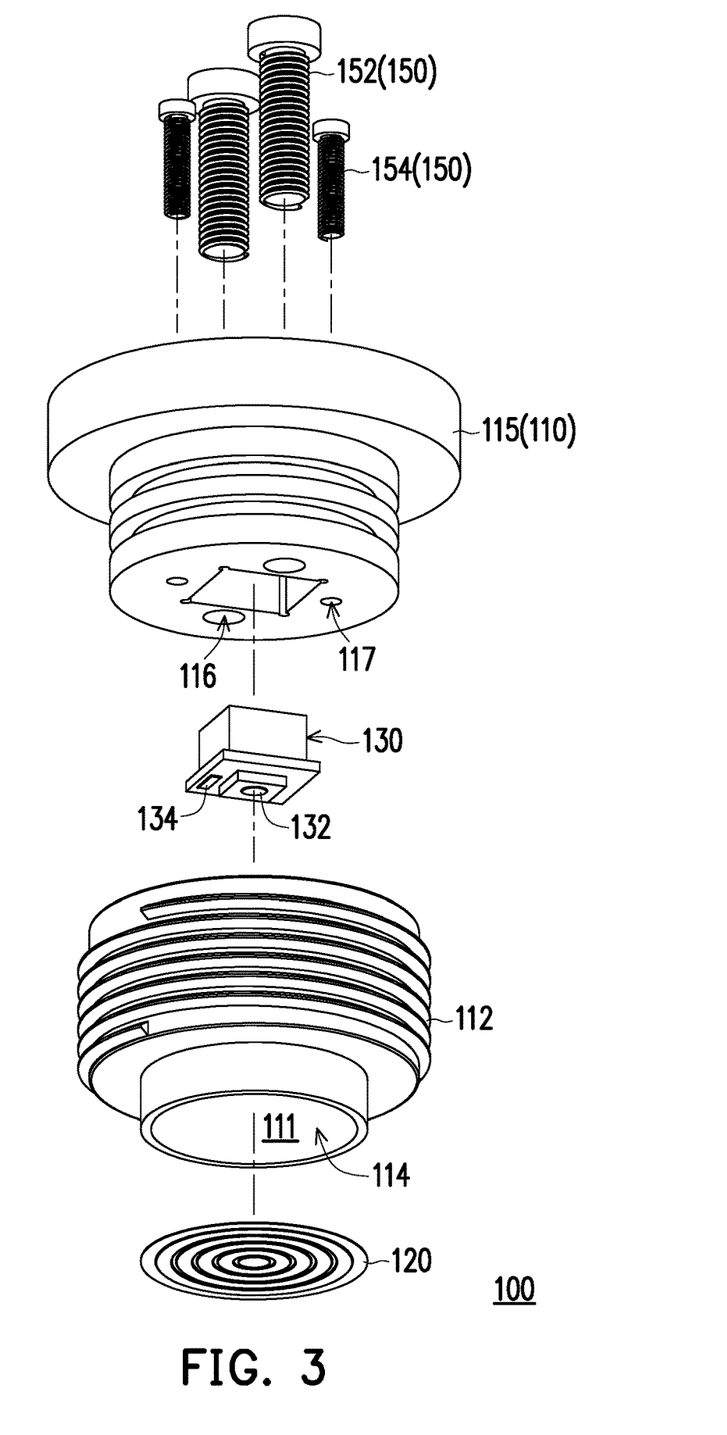
FIG. 3 is an exploded view of the pressure sensor of FIG. 1.
Figure 4:
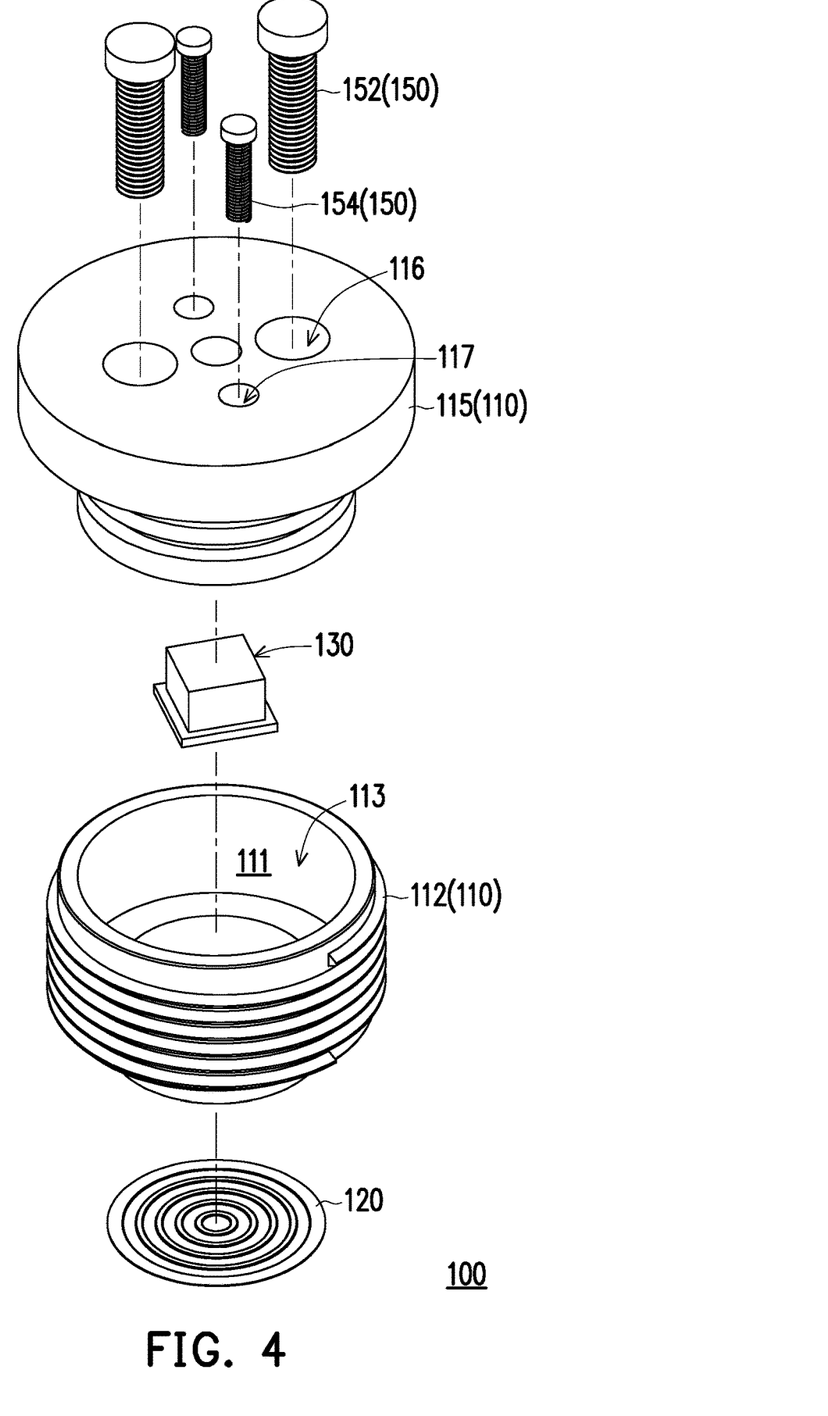
FIG. 4 is a diagram of FIG. 3 from another angle.
Figure 5A:
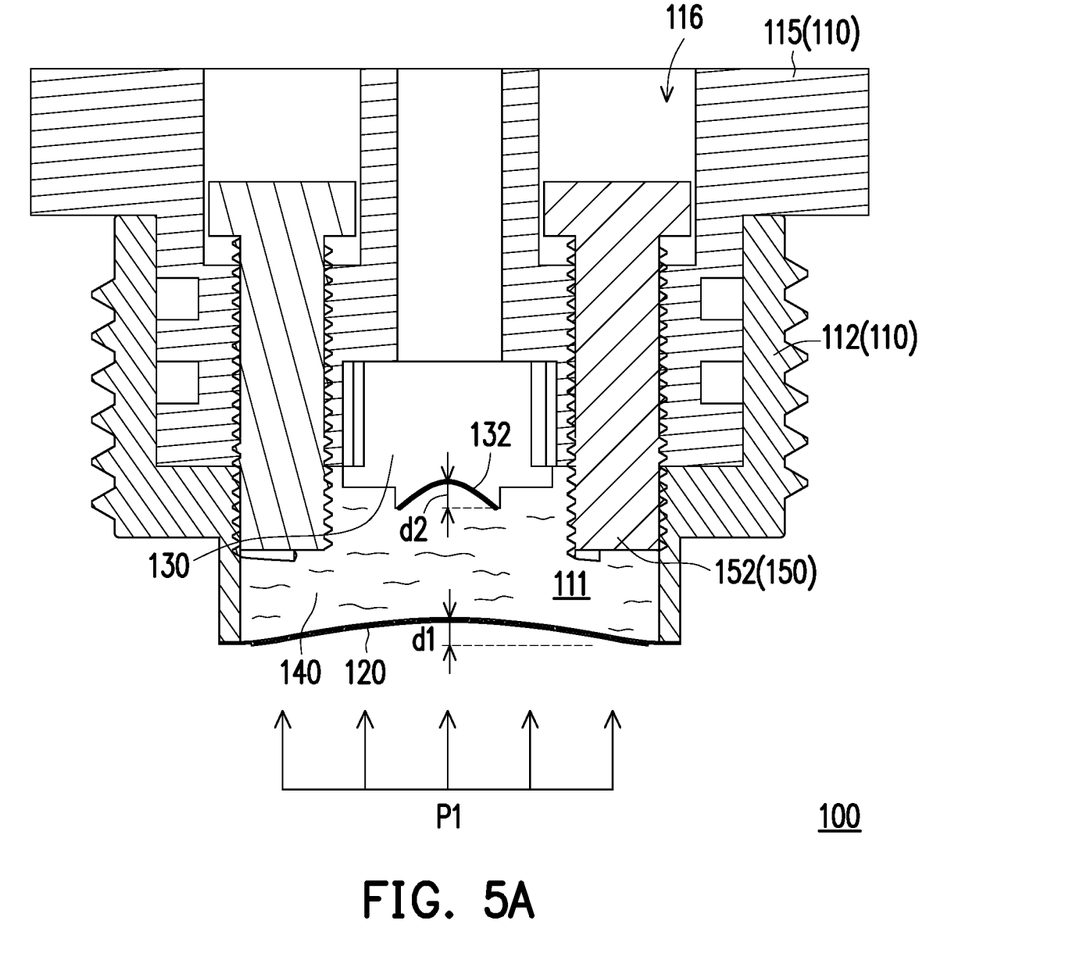
FIG. 5A is a cross-sectional view of the pressure sensor of FIG. 1.

FIG. 1 is a diagram of a pressure sensor with calibration function according to an embodiment of the disclosure. FIG. 2 is a perspective view of the pressure sensor of FIG. 1. FIG. 3 is an exploded view of the pressure sensor of FIG. 1. FIG. 4 is a diagram of FIG. 3 from another angle. FIG. 5A is a cross-sectional view of the pressure sensor of FIG. 1.

Please refer to FIG. 1 to FIG. 5A, in the present embodiment, a pressure sensor 100 with calibration function may be applied to, for example, the pipeline of the etching solution in the PCB processing equipment, but the application field and equipment of the pressure sensor 100 are not limited thereto. In other embodiments, the pressure sensor 100 may be applied to measure the pressure of various fluids in various pipelines. Examples are provided below. The pressure sensor 100 may be applied to measure the water pressure in a water pipe or the oil pressure in an oil pipe. In the present embodiment, the pressure sensor 100 includes a casing 110, a diaphragm 120, a sensing element 130 (FIG. 3), a medium 140 (FIG. 5A), and at least one calibration element 150 (FIG. 3).

In the present embodiment, the casing 110 includes a cylinder 112 and an adjusting seat 115. The cylinder 112 includes a first opening 113 (FIG. 4) and a second opening 114 (FIG. 3) opposite to each other. The adjusting seat 115 is disposed at one end of the cylinder 112 to seal the first opening 113, and the diaphragm 120 is disposed at another end of the cylinder 112 of the casing 110 to seal the second opening 114. The casing 110 and the diaphragm 120 define the accommodating space 111 (FIG. 3). In the present embodiment, the cylinder 112 and the adjusting seat 115 jointly form the casing 110 to facilitate assembly. Of course, in other embodiments, the casing 110 may also be a single member. In addition, the cylinder 112, the adjusting seat 115, and the diaphragm 120 may all be made of anti-corrosion materials, so as to be suitable for measuring the pressure of the etching solution in a PCB wet process equipment.

As shown in FIG. 5A, the sensing element 130 is disposed in the casing 110. The medium 140 is filled in the accommodating space 111 and in contact with the sensing element 130. The medium 140 is, for example, oil or other liquids. In an embodiment, the medium 140 may also be air. As shown in FIG. 3, the sensing element 130 includes a sensing film 132. The sensing element 130 senses a pressure P1 via the deflection of the sensing film 132.

Specifically, when the pressure sensor 100 is placed in a pressure environment (for example, a inside of pipeline for transporting an etching solution), the diaphragm 120 is concave under the external pressure P1 (as shown in FIG. 5A, the amount of deflection of the diaphragm 120 is, for example, d1). When a pressure is applied to the medium 140 in the accommodating space 111, the pressure P1 is further transferred to the sensing film 132 of the sensing element 130 via the medium 140. The amount of deflection of the sensing film 132 is d2, wherein d2 is greater than d1. Therefore, the sensing element 130 may sense the pressure P1 in the pressure environment.

In order to adjust and/or calibrate the pressure sensed by the sensing element 130, in the present embodiment, at least one calibration element 150 is adjustably disposed on the adjusting seat 115 of the casing 110, and the calibration element 150 is extended into the accommodating space 111 to be in contact with the medium 140.

In the present embodiment, the calibration element 150 is exemplified by a screw, but is not limited thereto. The casing 110 includes at least one screw hole 116 and 117 (FIG. 3) communicating with the accommodating space 111. The calibration element 150 is coupled to the corresponding screw hole 116 and 117 and is suitable for adjusting the volume extended into the accommodating space 111 to be in contact with the medium 140.

When the calibration element 150 is moved relative to the casing 110, the calibration element 150 changes the pressure applied to the medium 140, thus affecting the pressure value sensed by the sensing element 130 and achieving the effect of adjusting or/and calibrating the pressure value.

If the pressure value sensed by the sensing element 130 is not zero, the pressure sensor 100 needs to perform zeroing calibration. When the pressure sensor 100 performs zeroing calibration, the user may move the calibration element 150 relative to the casing 110 to change the pressure applied to the medium 140 until the pressure value sensed by the sensing element 130 is equal to zero.

Figure 5B:
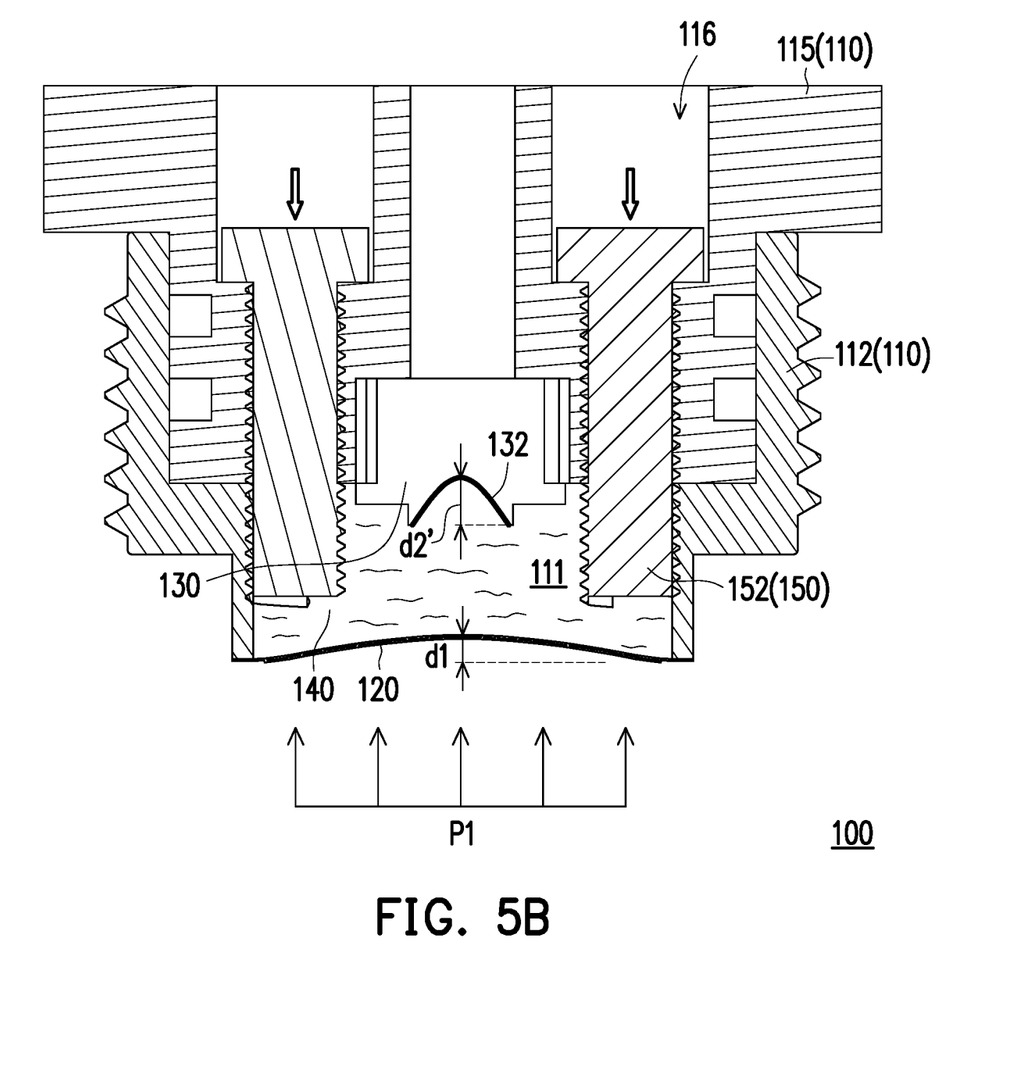
FIG. 5B is a diagram of moving the calibration element of FIG. 5A in a direction toward the casing.

Specifically, FIG. 5B is a diagram of moving the calibration element of FIG. 5A in a direction toward the casing. Referring to FIG. 5A and FIG. 5B, in the state of FIG. 5A, when the pressure value of the pressure sensor 100 is less than zero, in order to increase the pressure value of the pressure sensor 100 to zero, the user may move the calibration element 150 in a direction toward the casing 110. At this time, the volume of the calibration element 150 extended into the accommodating space 111 is increased, and the pressure applied by the calibration element 150 to the medium 140 is increased. The amount of deflection of the sensing film 132 of the sensing element 130 is increased to d2', wherein d2' is greater than d2, so that the pressure value of the pressure sensor 100 may be increased from negative to zero, so as to achieve the effect of zeroing calibration.

Figure 5C:
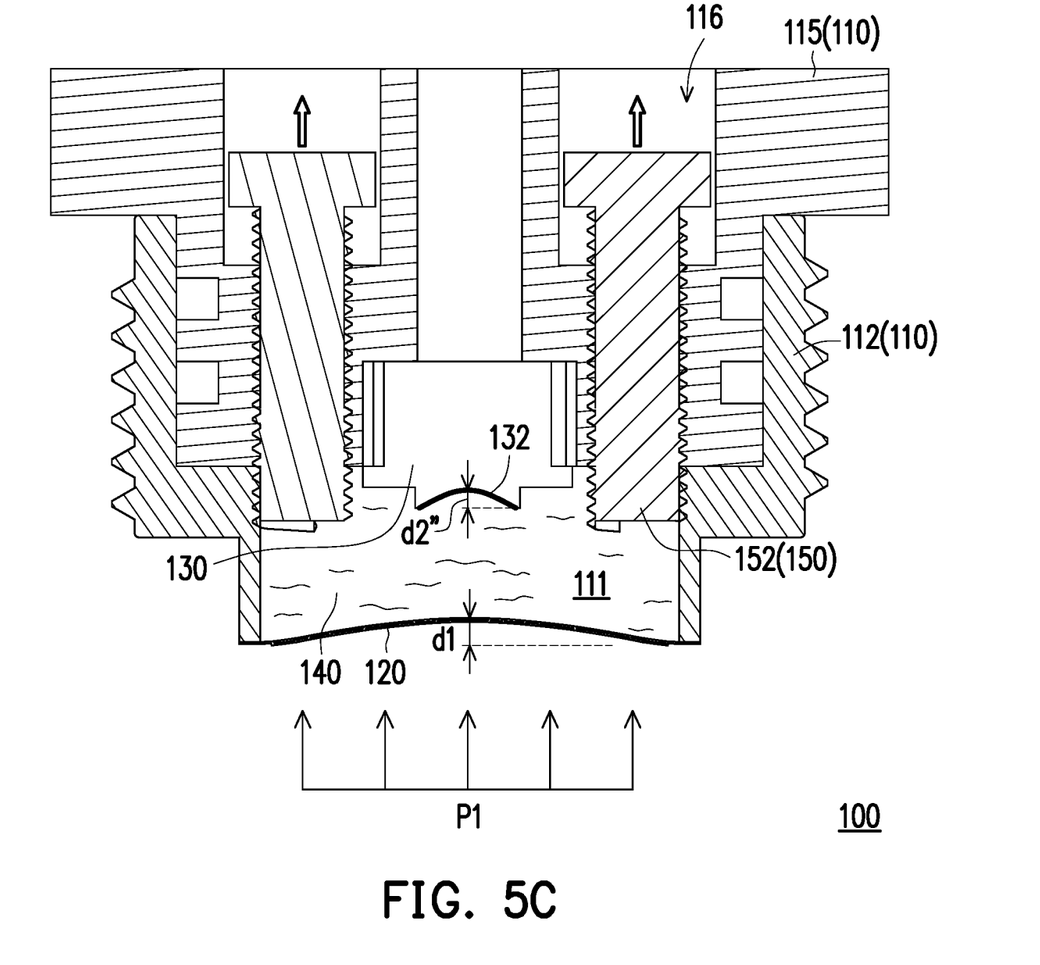
FIG. 5C is a diagram of moving the calibration element of FIG. 5A in a direction away from the casing.

Similarly, FIG. 5C is a diagram of moving the calibration element of FIG. 5A in a direction away from the casing. Referring to FIG. 5A and FIG. 5C, in the state of FIG. 5A, when the pressure value of the pressure sensor 100 is greater than zero, in order to decrease the pressure value of the pressure sensor 100 to zero, the user may move the calibration element 150 in a direction away from the casing 110. At this time, the volume of the calibration element 150 extended into the accommodating space 111 is decreased, and the pressure applied by the calibration element 150 to the medium 140 is decreased. The amount of deflection of the sensing film 132 of the sensing element 130 is decreased to d2", wherein d2" is less than d2, so that the pressure value of the pressure sensor 100 may be reduced from positive to zero, so as to achieve the effect of zeroing calibration.

If the pressure sensor 100 needs to be calibrated for a specific value of pressure. When the pressure value sensed by the sensing element 130 is not equal to a specific value, the user may move the calibration element 150 relative to the casing 110 to change the pressure applied to the medium 140 until the pressure value sensed by the sensing element 130 is equal to the specific value of pressure.

Specifically, when the pressure sensor 100 needs to be calibrated for a specific value of pressure which is greater than that of the pressure sensor 100, the user may move the calibration element 150 in a direction toward the casing 110 in order to increase the pressure value of the pressure sensor 100 to the specific value. At this time, the volume of the calibration element 150 extended into the accommodating space 111 is increased, and the pressure applied by the calibration element 150 to the medium 140 is increased. Therefore, the pressure value of the pressure sensor 100 may be increased to the specific value to achieve the calibration for a specific value of pressure.

Moreover, if the pressure value of the pressure sensor 100 is greater than the specific value, the user may move the calibration element 150 in a direction away from to the casing 110 in order to decrease the pressure value of the pressure sensor 100 to the specific value. At this time, the volume of the calibration element 150 extended into the accommodating space 111 is decreased, and the pressure applied by the calibration element 150 to the medium 140 is decreased. Therefore, the pressure value of the pressure sensor 100 may be decreased to the specific value to achieve the calibration for a specific value of pressure.

In other words, the pressure sensor 100 of the present embodiment adjusts or/and calibrates the pressure value sensed by the sensing element 130 via a physical method by which the calibration element 150 enters or is protruded from the accommodating space 111 for zeroing calibration. The calibration method does not need to be performed via an electronic circuit method, and therefore the calibration method has the advantages of simplicity, convenience, and low cost. In addition, when the calibration element 150 of the pressure sensor 100 of the present embodiment enters or is protruded from the accommodating space 111, a greater pressure change is generated, so that a large pressure calibration range may be achieved. Therefore, compared with an electronic circuit calibration method, the pressure sensor 100 of the present embodiment calibrates the pressure value sensed by the sensing element 130 via a physical method to achieve a greater calibration range. In addition, after the calibration is completed, the calibration element 150 continues to stay at this position and continues to apply the same pressure to the medium 140 so that the pressure value is a constant.

Please refer to FIG. 3, in the present embodiment, the at least one calibration element 150 includes a first calibration element 152 and a second calibration element 154. The volume of the first calibration element 152 is different from the volume of the second calibration element 154. Specifically, the volume of the first calibration element 152 is greater than the volume of the second calibration element 154. The first calibration element 152 may be used for preliminary adjustment (rough adjustment), and the second calibration element 154 may be used for fine adjustment. More specifically, in the present embodiment, the first calibration element 152 and the second calibration element 154 have the same length, and the cross-sectional area of the first calibration element 152 may be 1.5 to 5 times the cross-sectional area of the second calibration element 154. Therefore, the volume of the first calibration element 152 is greater than the volume of the second calibration element 154. In the present embodiment, the cross-sectional area of the second calibration element 154 may be used to control the precision of fine adjustment. In another embodiment, the first calibration element 152 and the second calibration element 154 may have different sizes (for example, length), so that the volume of the first calibration element 152 is greater than the volume of the second calibration element 154.

Moreover, in the present embodiment, the number of the first calibration element 152 is two, and the number of the second calibration element 154 is also two. The two first calibration elements 152 are disposed symmetrically, and the two second calibration elements 154 are disposed symmetrically to apply a uniform pressure. Of course, in other embodiments, the number and the positional relationship of the first calibration element 152 and the second calibration element 154 are not limited thereto. In addition, in other embodiments, the number of the first calibration element 152 and the number of the second calibration element 154 may also not correspond to each other.

It is worth mentioning that in the present embodiment, the casing 110 has a first rigidity. The diaphragm 120 has a second rigidity. The sensing film 132 of the sensing element 130 has a third rigidity. The calibration element 150 has a fourth rigidity. The first rigidity of the casing 110 and the fourth rigidity of the calibration element 150 are greater than the second rigidity of the diaphragm 120, and the second rigidity of the diaphragm 120 is greater than the third rigidity of the sensing film 132.

In addition, in the implementation of the disclosure, the rigidity of an element may be defined as: the pressure that needs to be applied to the element when the surface of the element generates a unit of amount of deflection. Therefore, when subjected to the same pressure, the greater the rigidity of the element, the smaller the resulting amount of deflection.

It may be known from simulation that when the rigidity relationships are described as above, the calibration element 150 performs an effective calibration. Moreover, when the first rigidity is greater than $10^4$ times the second rigidity, the fourth rigidity is greater than $10^4$ times the second rigidity, and when the second rigidity is 1.5 to 3 times the third rigidity, the calibration element 150 performs an effective calibration. In addition, when the first rigidity is greater than $10^4$ times the second rigidity, the fourth rigidity is greater than $10^4$ times the second rigidity, and when the second rigidity is 1.5 to 3 times the third rigidity, the pressure applied by the calibration element 150 to the medium 140 may be transferred to the sensing film 132 more efficiently. In other words, when the first rigidity is greater than $10^4$ times the second rigidity, the fourth rigidity is greater than $10^4$ times the second rigidity, and when the second rigidity is 1.5 to 3 times the third rigidity, the volume of the calibration element 150 entering the accommodating space 111 does not need to be large to deflect the sensing film 132 as needed, so that the pressure sensor 100 may complete the effective calibration. More specifically, when the calibration element 150 enters the accommodating space 111, the medium in the accommodating space 111 (for example: water, oil, or other incompressible liquids) applies the pressure P1 to the casing 110, the diaphragm 120, the sensing film 132 of the sensing element 130, and the calibration element 150. When the volume of the calibration element 150 entering the accommodating space 111 is greater, the resulting pressure P1 is greater. In the present embodiment, since the first rigidity of the casing 110 and the fourth rigidity of the calibration element 150 are greater than the second rigidity of the diaphragm 120, and the second rigidity of the diaphragm 120 is greater than the third rigidity of the sensing film 132. Therefore, under the same pressure P1, the sensing film 132 has the largest amount of deflection. Therefore, when the volume of the calibration element 150 entering the accommodating space 111 does not need to be too large, the sensing film 132 may be deflected sufficiently to complete the effective calibration of the pressure sensor 100.

In addition, in the present embodiment, the sensing element 130 further includes a thermometer 134 (FIG. 3) and a signal processing unit (not shown). The thermometer 134 is used to measure the temperature of the medium 140. The temperature measured by the thermometer 134 may be transferred to a processing unit to calibrate the measured pressure so as to compensate for the measurement error of the pressure caused by the temperature. The temperature measured by the thermometer 134 may also be transferred to a PCB processing equipment (not shown) to improve the controllability of the process quality.

Figure 6:
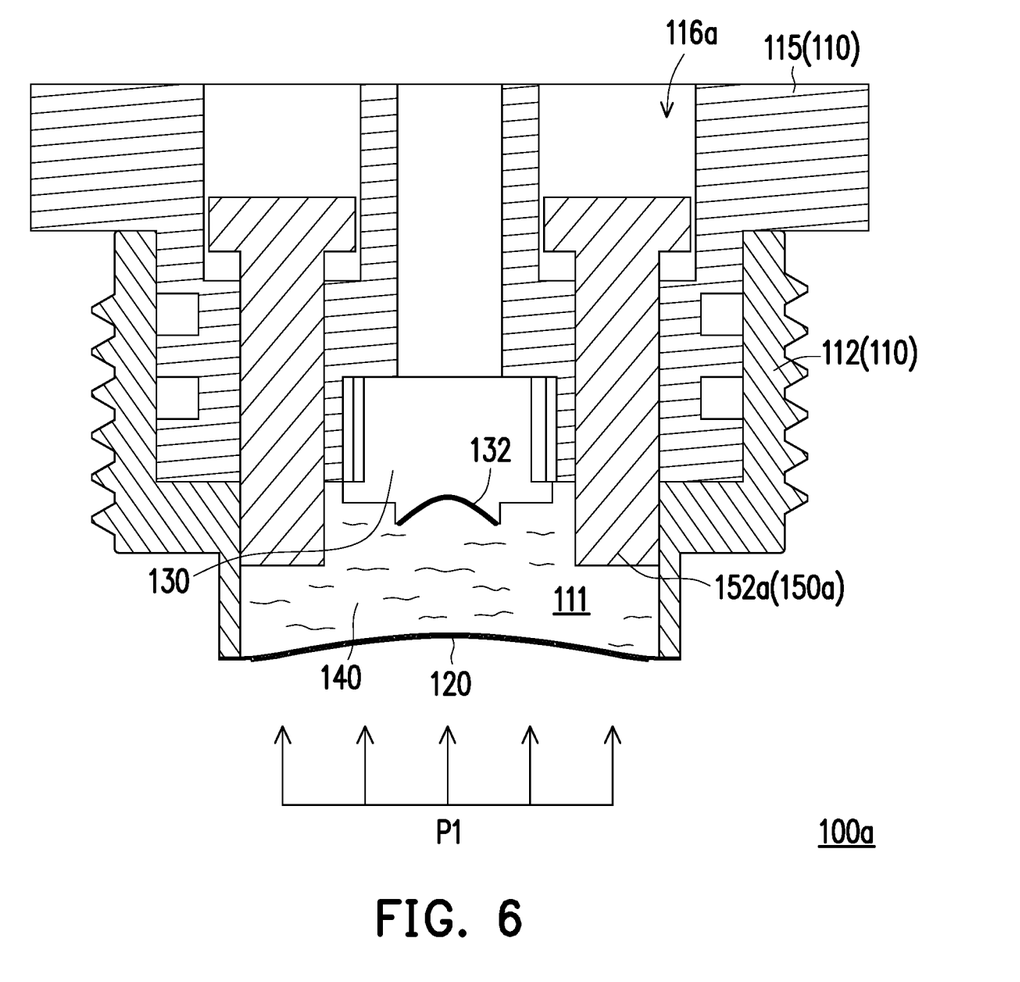
FIG. 6 is a cross-sectional view of a pressure sensor with calibration function according to another embodiment of the disclosure.

FIG. 6 is a cross-sectional view of a pressure sensor with calibration function according to another embodiment of the disclosure. Referring to FIG. 6, the main difference between the pressure sensor 100 of FIG. 5A and a pressure sensor 100a of FIG. 6 is the calibration element 150a. In the pressure sensor 100 of FIG. 5A, the calibration element 150 is a screw, and the casing 110 has the corresponding screw holes 116 and 117. The user adjusts the volume of the calibration element 150 entering or exiting the accommodating space 111 by rotating the calibration element 150. In the present embodiment (FIG. 6), the calibration element 150a is, for example, a stud without threads on the outer surface. The casing 110 has a corresponding through-hole 116a, and the calibration element 150a is coupled to the corresponding through-hole 116a and in contact with the inner wall surface of the through-hole 116a, and stays at a specific position in the through-hole 116a. When the volume of the calibration element 150a entering or exiting the accommodating space 111 is to be adjusted, the user applies a force to push the calibration element 150a into the accommodating space 111 or pull the calibration element 150a outward to adjust the volume of the calibration element 150a extended into the accommodating space 111. Similarly, the calibration element 150a includes a first calibration element 152a and a second calibration element (not shown) with different volumes.

Figure 7:
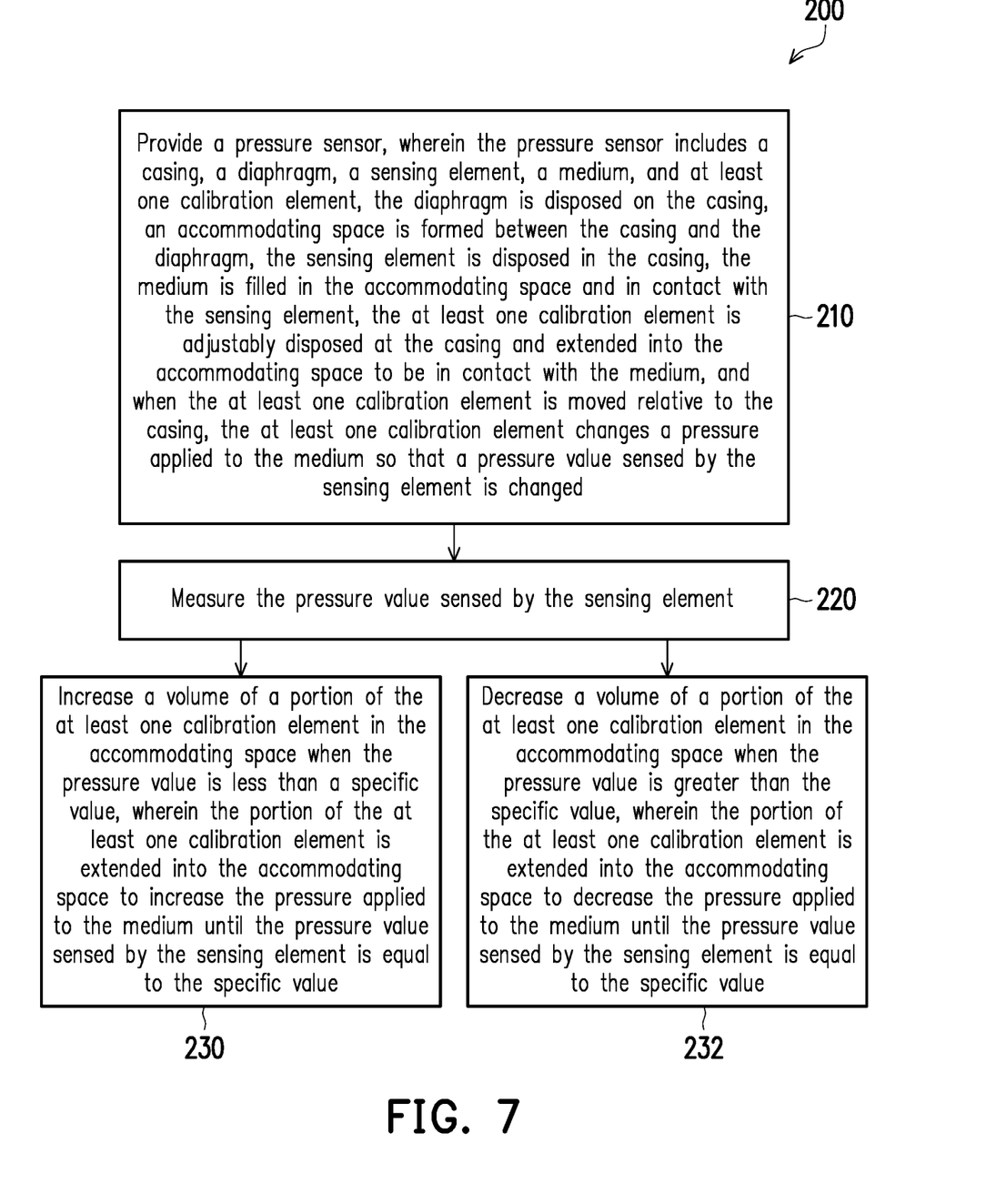
FIG. 7 is a flowchart of a calibration method of a pressure sensor with calibration function according to an embodiment of the disclosure.

FIG. 7 is a flowchart of a calibration method of a pressure sensor with calibration function according to an embodiment of the disclosure. Please refer to FIG. 7, a calibration method 200 of a pressure sensor of the present embodiment may be applied to the pressure sensors 100 and 100a. The pressure sensor 100 is taken as an example below. The calibration method 200 of the pressure sensor includes the following steps.

First, in step 210, the pressure sensor 100 is provided. The pressure sensor 100 includes the casing 110, the diaphragm 120, the sensing element 130, the medium 140, and the at least one calibration element 150. The diaphragm 120 is disposed on the casing 110. The casing 110 and the diaphragm 120 define the accommodating space 111, and the sensing element 130 is disposed in the casing 110. The medium 140 is filled in the accommodating space 111 and in contact with the sensing element 130. The at least one calibration element 150 is adjustably disposed in the casing 110 and extended into the accommodating space 111 to be in contact with the medium 140. When the at least one calibration element 150 is moved relative to the casing 110, the at least one calibration element 150 changes a pressure applied to the medium 140, so that a pressure value sensed by the sensing element 130 is changed.

Next, in step 220, the pressure value sensed by the sensing element 130 is measured.

In step 230, when the pressure value is less than a specific value, the at least one calibration element 150 is moved in a direction toward the casing 110 (such as moving from FIG. 5A to FIG. 5B), and the volume of a portion of the at least one calibration element 150 in the accommodating space 111 is increased. The portion of the at least one calibration element 150 is extended into the accommodating space to increase the pressure applied to the medium 140 until the pressure value sensed by the sensing element 130 is equal to the specific value. In the present embodiment, the specific value is, for example, zero, but is not limited thereto.

In step 232, when the pressure value is greater than the specific value, the at least one calibration element 150 is moved in a direction away from the casing 110 (such as moving from FIG. 5A to FIG. 5C), and the volume of a portion of the at least one calibration element 150 in the accommodating space 111 is decreased. The portion of the at least one calibration element 150 is extended into the accommodating space to decrease the pressure applied to the medium 140 until the pressure value sensed by the sensing element 130 is equal to the specific value.

Based on the above, the pressure sensor with calibration function of the disclosure performs calibration by the calibration element which is adjustably disposed at the casing and is able to be extended into the accommodating space to contact the medium. When the pressure of the pressure sensor with calibration function of the disclosure needs to be adjusted, the calibration element may be moved relative to the casing, and the calibration element changes the pressure applied to the medium so that and the pressure value sensed by the sensing element is changed to achieve effective calibration. The pressure sensor with calibration function of the disclosure adjusts or/and calibrates the pressure value sensed by the sensing element via a physical method (the calibration element enters or is protruded from the accommodating space), and calibration does not need to be performed via an electronic circuit method, and therefore, this calibration method is simple, convenient, low-cost, and may have a greater calibration range.

What is claimed is:

1. A pressure sensor with calibration device, comprising:
    a casing;
    a diaphragm disposed on the casing, wherein the casing and the diaphragm define an accommodating space;
    a sensing element disposed in the casing;
    a medium filled in the accommodating space and in contact with the sensing element; and
    at least one calibration element adjustably disposed at the casing and extended into the accommodating space to be in contact with the medium, wherein the casing comprises at least one hole communicating with the accommodating space, wherein each of the at least one calibration element is coupled to the corresponding hole, when the at least one calibration element is moved relative to the casing in a direction toward the accommodating space or in a direction away from the accommodating space, the at least one calibration element changes a pressure applied to the medium.

2. The pressure sensor with calibration device of claim 1, wherein the at least one hole comprises at least one through-hole, wherein each of the at least one calibration element is coupled to the corresponding through-hole and is suitable for adjusting a volume extended into the accommodating space.

3. The pressure sensor with calibration device of claim 1, wherein the at least one hole comprises at least one screw hole, wherein each of the at least one calibration element is a screw that is coupled to the corresponding screw hole and is suitable for adjusting a volume extended into the accommodating space.

4. The pressure sensor with calibration device of claim 1, wherein the at least one calibration element comprises a first calibration element and a second calibration element, and a volume of the first calibration element is different from a volume of the second calibration element.

5. The pressure sensor with calibration device of claim 1, wherein the casing comprises a cylinder and an adjusting seat, the cylinder comprises a first opening and a second opening opposite to each other, the adjusting seat is disposed at one end of the cylinder to seal the first opening, the diaphragm is disposed at another end of the cylinder to seal the second opening, and the at least one calibration element is adjustably disposed on the adjusting seat.

6. The pressure sensor with calibration device of claim 1, wherein the sensing element further comprises a thermometer to measure a temperature of the medium.

7. The pressure sensor with calibration device of claim 1, wherein when a pressure value sensed by the sensing element is not equal to a specific value, the at least one calibration element is moved relative to the casing in the direction toward the accommodating space or in the direction away from the accommodating space to change the pressure applied to the medium until the pressure value sensed by the sensing element is equal to the specific value.

8. The pressure sensor with calibration device of claim 7, wherein when the pressure value is less than the specific value, the at least one calibration element is moved in the direction toward the accommodating space, and when the pressure value is greater than the specific value, the at least one calibration element is moved in the direction away from the accommodating space.

9. The pressure sensor with calibration device of claim 8, wherein the specific value is zero.

10. A pressure sensor with calibration device, comprising:
a casing having a first rigidity;
a diaphragm disposed on the casing and having a second rigidity, wherein the casing and the diaphragm define an accommodating space;
a sensing element disposed in the casing and comprising a sensing film, wherein the sensing film has a third rigidity;
a medium filled in the accommodating space and in contact with the sensing element; and
at least one calibration element adjustably disposed at the casing and extended into the accommodating space to be in contact with the medium, wherein each of the at least one calibration element has a fourth rigidity, the casing comprises at least one hole communicating with the accommodating space, wherein each of the at least one calibration element is coupled to the corresponding hole, and when the at least one calibration element is moved relative to the casing in a direction toward the accommodating space or in a direction away from the accommodating space, the at least one calibration element changes a pressure applied to the medium so that a pressure value sensed by the sensing element is changed, and
the first rigidity and the fourth rigidity are greater than the second rigidity, and the second rigidity is greater than the third rigidity.

11. The pressure sensor with calibration device of claim 10, wherein the first rigidity is greater than $10^4$ times the second rigidity, and the fourth rigidity is greater than $10^4$ times the second rigidity.

12. The pressure sensor with calibration device of claim 10, wherein the second rigidity is 1.5 to 3 times the third rigidity.

13. The pressure sensor with calibration device of claim 10, wherein the at least one hole comprises at least one through-hole, wherein each of the at least one calibration element is coupled to the corresponding through-hole and is suitable for adjusting a volume extended into the accommodating space.

14. The pressure sensor with calibration device of claim 10, wherein the at least one hole comprises at least one screw hole, wherein each of the at least one calibration element is a screw that is coupled to the corresponding screw hole and is suitable for adjusting a volume extended into the accommodating space.

15. The pressure sensor with calibration device of claim 10, wherein the at least one calibration element comprises a first calibration element and a second calibration element, and a volume of the first calibration element is different from a volume of the second calibration element.

16. The pressure sensor with calibration device of claim 10, wherein the casing comprises a cylinder and an adjusting seat assembled to the cylinder, the cylinder comprises a first opening and a second opening opposite to each other, the adjusting seat is disposed at one end of the cylinder to seal the first opening, the diaphragm is disposed at another end of the cylinder to seal the second opening, and the at least one calibration element is adjustably disposed on the adjusting seat.

17. The pressure sensor with calibration device of claim 10, wherein the sensing element further comprises a thermometer to measure a temperature of the medium.

18. A calibration method of a pressure sensor with calibration device, comprising:
providing a pressure sensor, wherein the pressure sensor comprises a casing, a diaphragm, a sensing element, a medium, and at least one calibration element, the diaphragm is disposed on the casing, the casing and the diaphragm define an accommodating space, the sensing element is disposed in the casing, the medium is filled in the accommodating space and in contact with the sensing element, the at least one calibration element is adjustably disposed at the casing and extended into the accommodating space to be in contact with the medium, the casing comprises at least one hole communicating with the accommodating space, wherein each of the at least one calibration element is coupled to the corresponding hole, and when the at least one calibration element is moved relative to the casing in a direction toward the accommodating space or in a direction away from the accommodating space, the at least one calibration element changes a pressure applied to the medium so that a pressure value sensed by the sensing element is changed;
measuring the pressure value sensed by the sensing element;
increasing a volume of a portion of the at least one calibration element when the pressure value is less than a specific value, wherein the volume is extended into the accommodating space to increase the pressure applied to the medium until the pressure value sensed by the sensing element is equal to the specific value; and
decreasing the volume of the portion of the at least one calibration element when the pressure value is greater than the specific value, wherein the volume is extended into the accommodating space to decrease the pressure applied to the medium until the pressure value sensed by the sensing element is equal to the specific value.

19. The calibration method of the pressure sensor with calibration device of claim 18, wherein the at least one hole comprises at least one through-hole, each of the at least one calibration element is coupled to the corresponding through-hole, when the pressure value is less than the specific value, the at least one calibration element is moved in the direction toward the accommodating space, and when the pressure value is greater than the specific value, the at least one calibration element is moved in the direction away from the accommodating space.

20. The calibration method of the pressure sensor with calibration device of claim 18, wherein the at least one hole comprises at least one screw hole, each of the at least one calibration element is a screw that is coupled to the corresponding screw hole, when the pressure value is less than the specific value, the at least one calibration element is moved in the direction toward the accommodating space, and when the pressure value is greater than the specific value, the at least one calibration element is moved in the direction away from the accommodating space.

21. The calibration method of the pressure sensor with calibration device of claim 18, wherein the casing has a first rigidity, the diaphragm has a second rigidity, the sensing element has a third rigidity, each of the at least one calibration element has a fourth rigidity, the first rigidity and the fourth rigidity are greater than the second rigidity, and the second rigidity is greater than the third rigidity.

22. The calibration method of the pressure sensor with calibration device of claim 21, wherein the first rigidity is greater than $10^4$ times the second rigidity, and the fourth rigidity is greater than $10^4$ times the second rigidity.

23. The calibration method of the pressure sensor with calibration device of claim 21, wherein the second rigidity is 1.5 to 3 times the third rigidity.

24. The calibration method of the pressure sensor with calibration device of claim 18, wherein the at least one calibration element comprises a first calibration element and a second calibration element, and a volume of the first calibration element is different from a volume of the second calibration element.

25. The calibration method of the pressure sensor with calibration device of claim 18, wherein the casing comprises a cylinder and an adjusting seat assembled to the cylinder, the cylinder comprises a first opening and a second opening opposite to each other, the adjusting seat is disposed at one end of the cylinder to seal the first opening, the diaphragm is disposed at another end of the cylinder to seal the second opening, and the at least one calibration element is adjustably disposed on the adjusting seat.

26. The calibration method of the pressure sensor with calibration device of claim 18, wherein the sensing element further comprises a thermometer to measure a temperature of the medium.

* * * * *